(12) United States Patent
Hosotani

(10) Patent No.: US 10,511,194 B2
(45) Date of Patent: Dec. 17, 2019

(54) WIRELESS POWER TRANSFER SYSTEM

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co,. Ltd., Kyoto-fu (JP)

( * ) Notice: Subject to any disclaimer, the term of this patent is extended or adjusted under 35 U.S.C. 154(b) by 282 days.

(21) Appl. No.: 15/821,381

(22) Filed: Nov. 22, 2017

(65) Prior Publication Data
US 2018/0083491 A1 Mar. 22, 2018

Related U.S. Application Data

(63) Continuation of application No. PCT/JP2016/063948, filed on May 11, 2016.

(30) Foreign Application Priority Data

May 25, 2015 (JP) ................................ 2015-105330

(51) Int. Cl.
| | |
|---|---|
| *H02J 50/12* | (2016.01) |
| *H02J 3/01* | (2006.01) |
| *H02M 1/44* | (2007.01) |
| *H02M 3/335* | (2006.01) |
| *H02M 1/00* | (2006.01) |

(52) U.S. Cl.
CPC ............... *H02J 50/12* (2016.02); *H02J 3/01* (2013.01); *H02M 1/44* (2013.01);
(Continued)

(58) Field of Classification Search
CPC .. H02J 50/12; H02J 3/01; H02M 1/44; H02M 3/33576; H02M 2001/0058; Y02B 70/1491
See application file for complete search history.

(56) References Cited

U.S. PATENT DOCUMENTS

| | | | |
|---|---|---|---|
| 9,106,141 B2* | 8/2015 | Hosotani | H02M 3/3381 |
| 2015/0380949 A1* | 12/2015 | Hatanaka | H02J 50/12 |
| | | | 307/104 |
| 2016/0197492 A1* | 7/2016 | Fujita | H01F 38/14 |
| | | | 307/104 |

FOREIGN PATENT DOCUMENTS

| | | |
|---|---|---|
| JP | 2012-014093 A | 1/2012 |
| JP | 2013-055835 A | 3/2013 |

(Continued)

OTHER PUBLICATIONS

Takehiro Imura et al.; "Study of Magnetic and Electric Coupling for Contactless Power Transfer Using Equivalent Circuits"; Journal of the Institute of Electrical Engineers of Japan; Jan. 2010; vol. 130, No. 1; pp. 84-92; Japan; with partial English language translation.
(Continued)

*Primary Examiner* — Jared Fureman
*Assistant Examiner* — Michael J Warmflash
(74) *Attorney, Agent, or Firm* — Studebaker & Brackett PC

(57) ABSTRACT

A power receiving rectifier circuit is configured in series with a power receiving resonance mechanism. A first power receiving device has a load with a small equivalent resistance value, and the frequency response of a voltage gain thereof, which is the ratio of direct-current output to input voltage, is double-peaked. A second power receiving device has a load with a large equivalent resistance value, and a single-peaked frequency response of a voltage gain thereof. For the first power receiving device, by setting a coupling coefficient between power receiving and transmitting coils, the voltage gain is determined by the positional relationship between one of the frequencies at maximum voltage gain and the operating frequency, whereas for second power receiving device, the frequency at maximum voltage gain is determined close to the operating frequency, and the voltage (Continued)

gain is determined by setting a coupling coefficient between power receiving and transmitting coils.

20 Claims, 15 Drawing Sheets

(52) U.S. Cl.
CPC .................. *H02M 3/33576* (2013.01); *H02M 2001/0058* (2013.01); *Y02B 70/1491* (2013.01)

(56) References Cited

FOREIGN PATENT DOCUMENTS

| | | |
|---|---|---|
| JP | 2013-070590 A | 4/2013 |
| JP | 2014-030288 A | 2/2014 |
| WO | 2012/101905 A1 | 8/2012 |
| WO | 2014/125675 A1 | 8/2014 |
| WO | 2015/040650 A1 | 3/2015 |

OTHER PUBLICATIONS

An Office Action; "Notification of Reasons for Refusal," issued by the Japanese Patent Office dated Aug. 28, 2018, which corresponds to Japanese Patent Application No. 2017-520608 and is related to U.S. Appl. No. 15/821,381; with English language translation.
International Search Report issued in PCT/JP2016/063948; dated Jul. 5, 2016.
Written Opinion issued in PCT/JP2016/063948; dated Jul. 5, 2016.

\* cited by examiner

WIRELESS POWER TRANSFER SYSTEM

CROSS-REFERENCE TO RELATED APPLICATIONS

This application claims benefit of priority to International Patent Application No. PCT/JP2016/063948, filed May 11, 2016, and to Japanese Patent Application No. 2015-105330, filed May 25, 2015, the entire contents of each are incorporated herein by reference.

TECHNICAL FIELD

The present disclosure relates to a wireless power transfer system in which a power transmitting device and a power receiving device are coupled by electromagnetic field resonance coupling to wirelessly transfer power.

BACKGROUND

For practical application of wireless power transfer, research and development that reduces power loss in the entire system has been actively carried out in recent years. Particularly in systems where a power transmitting resonance mechanism and a power receiving resonance mechanism form an electromagnetic resonance field to wirelessly transfer power using electromagnetic field resonance coupling, it is possible to simplify the process of power transfer and reduce power loss, unlike in systems where a high-frequency magnetic field is applied to a resonator (see International Publication No. 2012/101905).

SUMMARY

A wireless power transfer system is a system where power is supplied from a power transmitting device to a power receiving device which are distant apart. For example, the wireless power transfer system may be a system where one power transmitting device wirelessly supplies power to a plurality of power receiving devices.

Through research and development on wireless power transfer systems, the present inventor has found out that systems where one power transmitting device wirelessly supplies power to a plurality of power receiving devices have the following problems.

(1) For a plurality of power receiving devices having equivalent resistance values that are different when viewed from a power transmitting device, a receiving voltage (load supply voltage) varies from one power receiving device to another.

(2) When the receiving voltage varies from one power receiving device to another, a power source voltage to be supplied to a load needs to be stabilized at a predetermined voltage by a voltage converter. This increases the size of each power receiving device.

(3) Power receiving devices with receiving voltages lower than the predetermined value and power receiving devices with receiving voltages higher than the predetermined value both exist. The power receiving devices with receiving voltages lower than the predetermined value lacks power, whereas the power receiving devices with receiving voltages higher than the predetermined value have excess power. To avoid lack of power, it is necessary to increase the transmitting power, and this increases the size of the power transmitting device. When received power is wasted or a voltage conversion ratio in the power receiving device is increased to avoid excess of power, heat dissipation and the like need to be taken into account, and this increases the size of the power receiving device.

An object of the present disclosure is to provide a wireless power transfer system that solves the problem of size increase described above, maintains high efficiency of wireless power transfer, and ensures supply of a stable voltage to a load of each power receiving device when power is wirelessly supplied from one power transmitting device to a plurality of power receiving devices.

(1) A wireless power transfer system according to the present disclosure includes a power transmitting device including a power transmitting coil and a plurality of power receiving devices each including a power receiving coil. The power transmitting device includes a power transmitting resonance capacitor forming a power transmitting resonance mechanism together with the power transmitting coil, and a power-transmitting alternating current voltage generating circuit configured to generate an alternating-current voltage in the power transmitting coil by driving a switching element electrically connected to the power transmitting coil at a predetermined operating frequency to intermittently apply a direct-current input voltage to the power transmitting resonance mechanism. The plurality of power receiving devices each include a power receiving resonance capacitor forming a power receiving resonance mechanism together with the power receiving coil, and a power receiving rectifier circuit connected to the power receiving coil and configured to rectify the alternating-current voltage to a direct-current output voltage. Electric field energy and magnetic field energy of each of the power transmitting resonance mechanism and the power receiving resonance mechanism interact with each other to form an electromagnetic resonance field. Between the power transmitting coil and the power receiving coil, magnetic field coupling by mutual inductance and electric field coupling by mutual capacitance form electromagnetic field resonance coupling. Power is thus wirelessly supplied from the power transmitting device to the power receiving devices. In the wireless power transfer system, the power receiving rectifier circuit is configured in series with the power receiving resonance mechanism, and configured such that the magnetic field energy of the power receiving resonance mechanism is supplied to a load. The plurality of power receiving devices include a first power receiving device having a load with a first equivalent resistance value and having a voltage gain whose frequency response is a double-peaked response with two maximum values, the voltage gain being a ratio of the direct-current output voltage to the direct-current input voltage, and a second power receiving device having a load with a second equivalent resistance value larger than the first equivalent resistance value and having a voltage gain whose frequency response is a single-peaked response. For the first power receiving device, by setting a coupling coefficient between the power receiving coil of the first power receiving device and the power transmitting coil, the voltage gain is determined by a positional relationship between the higher of frequencies corresponding to the two maximum values in the first power receiving device and the operating frequency. For the second power receiving device, a frequency at which the voltage gain is maximum is determined so as to be equal to the operating frequency, and the voltage gain in the second power receiving device is determined by setting a coupling coefficient between the power receiving coil of the second power receiving device and the power transmitting coil.

With this configuration, when the power receiving rectifier circuit of each power receiving device is configured in series with the power receiving resonance mechanism, and configured such that magnetic energy of the power receiving coil is supplied to the load, the efficiency of wireless power transfer is improved and a stable voltage is supplied to the load of each power receiving device.

(2) A wireless power transfer system according to the present disclosure includes a power transmitting device including a power transmitting coil and a plurality of power receiving devices each including a power receiving coil. The power transmitting device includes a power transmitting resonance capacitor forming a power transmitting resonance mechanism together with the power transmitting coil, and a power-transmitting alternating current voltage generating circuit configured to generate an alternating-current voltage in the power transmitting coil by driving a switching element electrically connected to the power transmitting coil at a predetermined operating frequency to intermittently apply a direct-current input voltage to the power transmitting resonance mechanism. The plurality of power receiving devices each include a power receiving resonance capacitor forming a power receiving resonance mechanism together with the power receiving coil, and a power receiving rectifier circuit connected to the power receiving coil and configured to rectify the alternating-current voltage to a direct-current output voltage. Electric field energy and magnetic field energy of each of the power transmitting resonance mechanism and the power receiving resonance mechanism interact with each other to form an electromagnetic resonance field. Between the power transmitting coil and the power receiving coil, magnetic field coupling by mutual inductance and electric field coupling by mutual capacitance form electromagnetic field resonance coupling. Power is thus wirelessly supplied from the power transmitting device to the power receiving devices. In the wireless power transfer system, the power receiving rectifier circuit is configured in parallel to the power receiving resonance mechanism, and configured such that the electric field energy of the power receiving resonance mechanism is supplied to a load. The plurality of power receiving devices include a third power receiving device having a load with a third equivalent resistance value and having a voltage gain whose frequency response is a double-peaked response with two maximum values, the voltage gain being a ratio of the direct-current output voltage to the direct-current input voltage, and a fourth power receiving device having a load with a fourth equivalent resistance value smaller than the third equivalent resistance value and having a voltage gain whose frequency response is a single-peaked response. For the third power receiving device, by setting a coupling coefficient between the power receiving coil of the third power receiving device and the power transmitting coil, the voltage gain is determined by a positional relationship between the higher of frequencies corresponding to the two maximum values in the third power receiving device and the operating frequency. For the fourth power receiving device, by setting a coupling coefficient between the power receiving coil of the fourth power receiving device and the power transmitting coil, the voltage gain is determined by a positional relationship between a frequency at which the voltage gain in the power receiving device is maximum and the operating frequency.

With this configuration, when the power receiving rectifier circuit of each power receiving device is configured in parallel to the power receiving resonance mechanism, and configured such that electric energy of the power receiving coil is supplied to the load, the efficiency of wireless power transfer is improved and a stable voltage is supplied to the load of each power receiving device.

(3) A wireless power transfer system according to the present disclosure includes a power transmitting device including a power transmitting coil and a plurality of power receiving devices each including a power receiving coil. The power transmitting device includes a power transmitting resonance capacitor forming a power transmitting resonance mechanism together with the power transmitting coil, and a power-transmitting alternating current voltage generating circuit configured to generate an alternating-current voltage in the power transmitting coil by driving a switching element electrically connected to the power transmitting coil at a predetermined operating frequency to intermittently apply a direct-current input voltage to the power transmitting resonance mechanism. The plurality of power receiving devices each include a power receiving resonance capacitor forming a power receiving resonance mechanism together with the power receiving coil, and a power receiving rectifier circuit connected to the power receiving coil and configured to rectify the alternating-current voltage to a direct-current output voltage. Electric field energy and magnetic field energy of each of the power transmitting resonance mechanism and the power receiving resonance mechanism interact with each other to form an electromagnetic resonance field. Between the power transmitting coil and the power receiving coil, magnetic field coupling by mutual inductance and electric field coupling by mutual capacitance form electromagnetic field resonance coupling. Power is thus wirelessly supplied from the power transmitting device to the power receiving devices. In the wireless power transfer system, the power receiving rectifier circuit is configured in series with the power receiving resonance mechanism, and configured such that the magnetic field energy of the power receiving resonance mechanism is supplied to a load. The plurality of power receiving devices include a first power receiving device having a load with a first equivalent resistance value and having a voltage gain whose frequency response is a double-peaked response with two maximum values, the voltage gain being a ratio of the direct-current output voltage to the direct-current input voltage, and a second power receiving device having a load with a second equivalent resistance value larger than the first equivalent resistance value and having a voltage gain whose frequency response is a single-peaked response. For the first power receiving device, by setting a coupling coefficient between the power receiving coil of the first power receiving device and the power transmitting coil, the lower of frequencies corresponding to the two maximum values in the first power receiving device is determined so as to be equal to the operating frequency, and the voltage gain in the first power receiving device is determined by setting the coupling coefficient between the power receiving coil of the first power receiving device and the power transmitting coil. For the second power receiving device, a frequency at which the voltage gain is maximum is determined so as to be equal to the operating frequency, and the voltage gain in the second power receiving device is determined by setting a coupling coefficient between the power receiving coil of the second power receiving device and the power transmitting coil.

With this configuration, when the power receiving rectifier circuit of each power receiving device is configured in parallel to the power receiving resonance mechanism, and configured such that electric energy of the power receiving coil is supplied to the load, the efficiency of wireless power transfer is improved and a stable voltage is supplied to the load of each power receiving device.

(4) A wireless power transfer system according to the present disclosure includes a power transmitting device including a power transmitting coil and a plurality of power receiving devices each including a power receiving coil. The power transmitting device includes a power transmitting resonance capacitor forming a power transmitting resonance mechanism together with the power transmitting coil, and a power-transmitting alternating current voltage generating circuit configured to generate an alternating-current voltage in the power transmitting coil by driving a switching element electrically connected to the power transmitting coil at a predetermined operating frequency to intermittently apply a direct-current input voltage to the power transmitting resonance mechanism. The plurality of power receiving devices each include a power receiving resonance capacitor forming a power receiving resonance mechanism together with the power receiving coil, and a power receiving rectifier circuit connected to the power receiving coil and configured to rectify the alternating-current voltage to a direct-current output voltage. Electric field energy and magnetic field energy of each of the power transmitting resonance mechanism and the power receiving resonance mechanism interact with each other to form an electromagnetic resonance field. Between the power transmitting coil and the power receiving coil, magnetic field coupling by mutual inductance and electric field coupling by mutual capacitance form electromagnetic field resonance coupling. Power is thus wirelessly supplied from the power transmitting device to the power receiving devices. In the wireless power transfer system, the power receiving rectifier circuit is configured in parallel to the power receiving resonance mechanism, and configured such that the electric field energy of the power receiving resonance mechanism is supplied to a load. The plurality of power receiving devices include a third power receiving device having a load with a third equivalent resistance value and having a voltage gain whose frequency response is a double-peaked response with two maximum values, the voltage gain being a ratio of the direct-current output voltage to the direct-current input voltage, and a fourth power receiving device having a load with a fourth equivalent resistance value smaller than the third equivalent resistance value and having a voltage gain whose frequency response is a single-peaked response. For the third power receiving device, by setting a coupling coefficient between the power receiving coil of the third power receiving device and the power transmitting coil, the lower of frequencies corresponding to the two maximum values in the third power receiving device is determined so as to be equal to the operating frequency, and the voltage gain in the third power receiving device is determined by setting the coupling coefficient between the power receiving coil of the third power receiving device and the power transmitting coil. For the fourth power receiving device, by setting a coupling coefficient between the power receiving coil of the fourth power receiving device and the power transmitting coil, the voltage gain is determined by a positional relationship between a frequency at which the voltage gain in the power receiving device is maximum and the operating frequency.

With this configuration, when the power receiving rectifier circuit of each power receiving device is configured in parallel to the power receiving resonance mechanism, and configured such that electric energy of the power receiving coil is supplied to the load, the efficiency of wireless power transfer is improved and a stable voltage is supplied to the load of each power receiving device.

(5) In any one of the configurations (1) to (4) described above, the coupling coefficient is preferably determined by a difference in the size or shape of the power receiving coil with respect to the power transmitting coil. With this configuration, the coupling coefficient between the power transmitting coil and the power receiving coil can be easily set for each power receiving device.

(6) In any one of the configurations (1) to (4) described above, the coupling coefficient is preferably determined by a distance of the power receiving coil to the power transmitting coil (inter-coil distance). With this configuration, the coupling coefficient between the power transmitting coil and the power receiving coil can be easily set for each power receiving device.

According to the present disclosure, it is possible to solve the problem of size increase described above, maintain high efficiency of wireless power transfer, and ensure supply of a stable voltage to a load of each power receiving device when power is wirelessly supplied from one power transmitting device to a plurality of power receiving devices.

DETAILED DESCRIPTION

First Embodiment

A first embodiment illustrates a wireless power transfer system where a power receiving rectifier circuit is configured in series with a power receiving resonance mechanism and configured such that magnetic energy of a power receiving coil is supplied to a load.

Figure 1A:
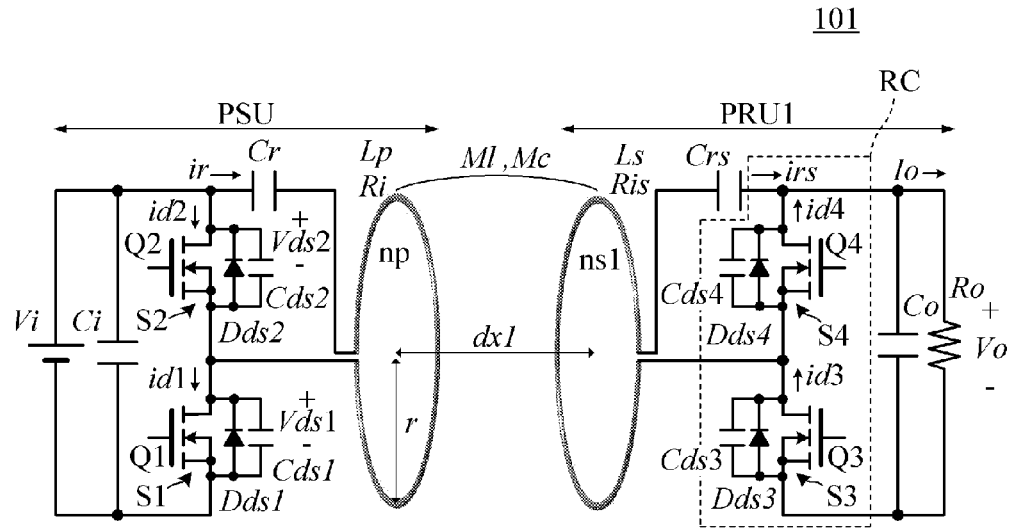
FIGS. 1(A) and 1(B) are each a circuit diagram of a wireless power transfer system according to a first embodiment.
Figure 1B:
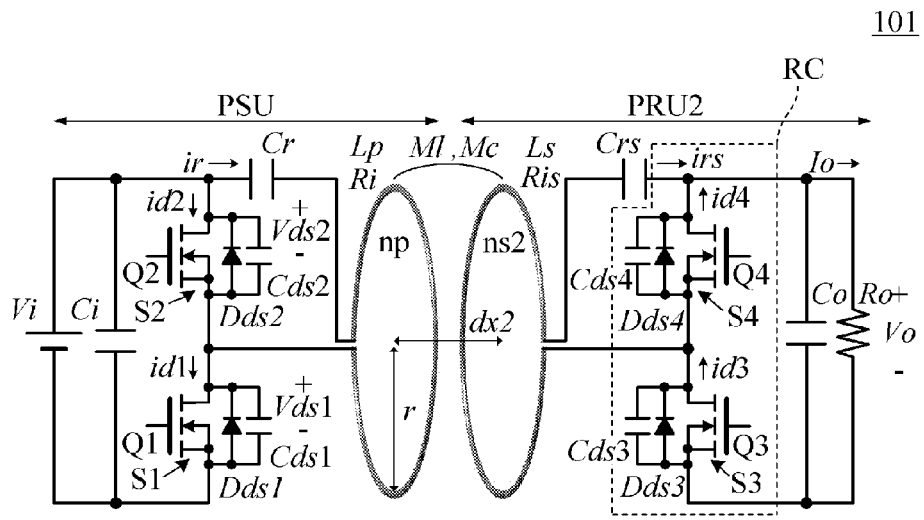

FIGS. 1(A) and 1(B) are each a circuit diagram of a wireless power transfer system 101 according to the first embodiment. The wireless power transfer system 101 includes a power transmitting device PSU, a first power receiving device PRU1, and a second power receiving device PRU2. Although FIGS. 1(A) and 1(B) each illustrate a pair of one power receiving device PRU1 or PRU2 and one power transmitting device PSU, a plurality of power receiving devices including the two power receiving devices PRU1 and PRU2 and one power transmitting device PSU may exist at the same time. The same applies to other embodiments described below. Also, each of the power transmitting devices and power receiving devices described herein can also generally be referred to as a power transmitter and a power receiver, respectively.

The wireless power transfer system 101 is a system that includes an input power source Vi at an input portion of the power transmitting device PSU and supplies a stable direct-current voltage to a load Ro of each of the first power receiving device PRU1 and the second power receiving device PRU2. In FIG. 1(A), the distance between a power transmitting coil np of the power transmitting device PSU and a power receiving coil ns1 of the first power receiving device PRU1 is dx1. In FIG. 1(B), the distance between the power transmitting coil np of the power transmitting device PSU and a power receiving coil ns2 of the second power receiving device PRU2 is dx2.

The power transmitting device PSU includes a power transmitting resonance mechanism formed by the power transmitting coil np and a power transmitting resonance capacitor Cr, and a power-transmitting alternating current generating circuit electrically connected to the power transmitting resonance mechanism.

The power-transmitting alternating current generating circuit includes a first switch circuit S1 equivalently formed by a parallel-connected circuit of a switching element Q1, a diode Dds1, and a capacitor Cds1, and a second switch circuit S2 equivalently formed by a parallel-connected circuit of a switching element Q2, a diode Dds2, and a capacitor Cds2.

The power transmitting device PSU includes a switching control circuit (not shown) that controls the switching elements Q1 and Q2. The switching control circuit alternately turns on and off the switching element Q1 of the first switch circuit S1 and the switching element Q2 of the second switch circuit S2 to generate an alternating-current voltage from the power-transmitting alternating current voltage generating circuit.

In the wireless power transfer system 101 of the present embodiment, the switching elements Q1 and Q2 are switching elements, such as MOSFETs, each having a parasitic output capacitance and a parasitic diode. The switching elements Q1 and Q2 form the switch circuits S1 and S2, respectively, using the parasitic output capacitance and the parasitic diode.

By switching the first switching element Q1 and the second switching element Q2 at a predetermined operating frequency, the switching control circuit intermittently applies a direct-current voltage to the power transmitting resonance mechanism to generate a resonance current in the power transmitting resonance mechanism. Thus, a voltage between both ends of each of the first switch circuit S1 and the second switch circuit S2 has a half-wave sinusoidal waveform with half-period intervals. For example, the switching operation is performed in the 6.78 MHz or 13.56 MHz band, which is an international industrial, scientific and medical (ISM) band.

In this example, the power-transmitting alternating current voltage generating circuit forms a half-bridge circuit including the two switch circuits S1 and S2.

The power receiving devices PRU1 and PRU2 each include the power receiving resonance mechanism including a corresponding one of the power receiving coils ns1 and ns2 and the power receiving resonance capacitor Crs, a power receiving rectifier circuit RC connected to the corresponding one of the power receiving coils ns1 and ns2 to rectify an alternating current generated in the corresponding one of the power receiving coils ns1 and ns2, and a smoothing capacitor Co.

A switch circuit S3 is formed by a parallel-connected circuit of a switching element Q3, a diode Dds3, and a capacitor Cds3. Similarly, a switch circuit S4 is formed by a parallel-connected circuit of a switching element Q4, a diode Dds4, and a capacitor Cds4.

The power receiving devices PRU1 and PRU2 each include a switching control circuit (not shown) that controls the switching elements Q3 and Q4. The switching control circuit detects a current flowing through a corresponding one of the power receiving coils ns1 and ns2, and alternately turns on and off the switching elements Q3 and Q4 in synchronization with reversal of polarity of the current. Thus, the resonance current flowing through the power receiving resonance mechanism is rectified in synchronization with changes in the flowing direction of the current, and is supplied to the load.

Figure 2A:
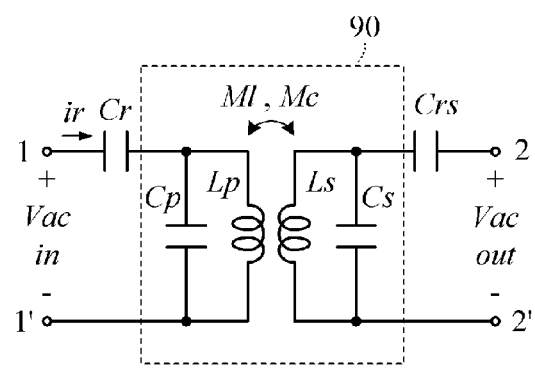
FIG. 2(A) is a circuit diagram of a multi-resonance circuit that includes an electromagnetic field resonance coupling circuit and equivalent electromagnetic field resonance coupling formed by resonance capacitors.
Figure 2B:
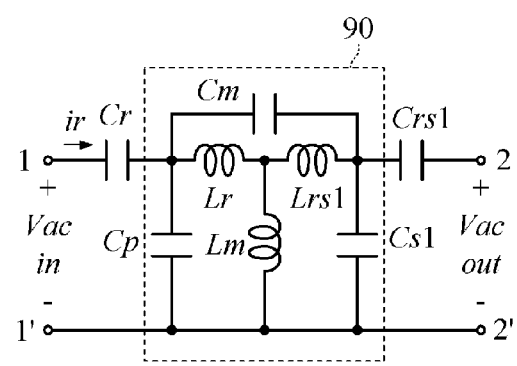
FIG. 2(B) is an equivalent circuit diagram of the multi-resonance circuit.
Figure 3:
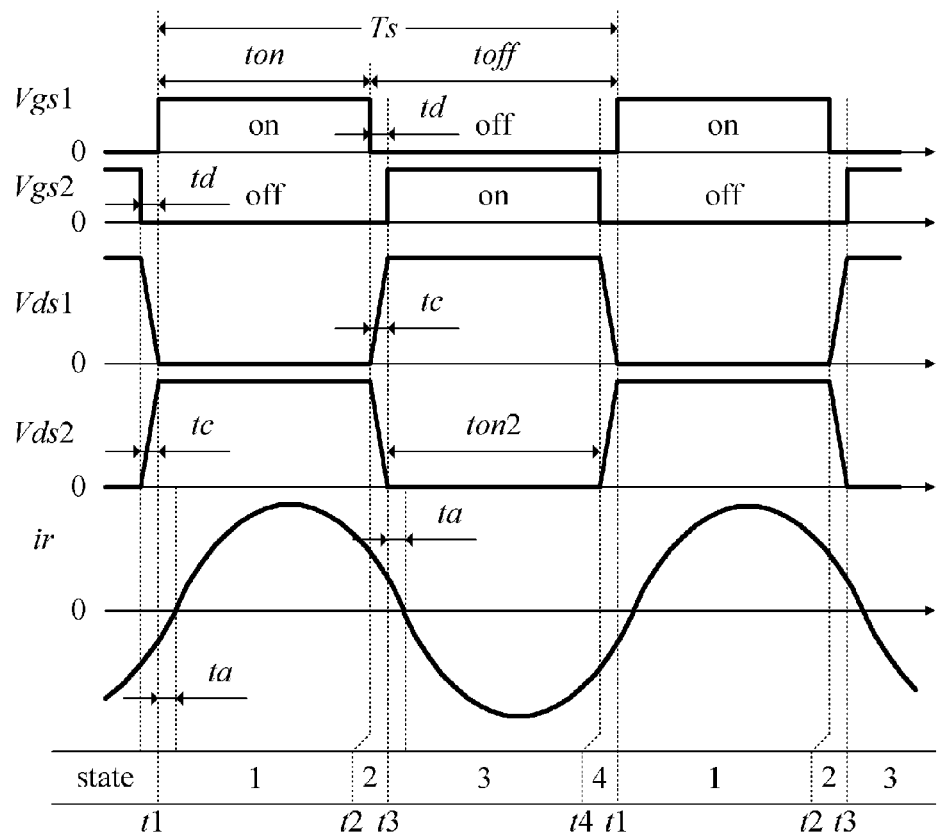
FIG. 3 is a diagram illustrating voltage and current waveforms at corresponding points and illustrates an energy conversion operation in the wireless power transfer system illustrated in FIGS. 1(A) and 1(B)

As discussed in more detail below, FIG. 2(A) is a circuit diagram of a multi-resonance circuit that includes the electromagnetic field resonance coupling circuit 90 and equivalent electromagnetic field resonance coupling formed by the resonance capacitors Cr and Crs, and FIG. 2(B) is an equivalent circuit diagram of the multi-resonance circuit. FIG. 3 is a diagram illustrating voltage and current waveforms at corresponding points and illustrates an energy conversion operation in the wireless power transfer system 101 illustrated in FIGS. 1(A) and 1(B). This example shows switching operation waveforms obtained when the switching elements perform an optimum zero voltage switching (ZVS) operation.

In the present operation, the operating state of the power transmitting device PSU can be divided, for each equivalent circuit, into the following four states: on-period, off-period, and two commutation periods. The gate-source voltages of the switching elements Q1 and Q2 are expressed as voltages Vgs1 and Vgs2, and the drain-source voltages of the switching elements Q1 and Q2 are expressed as voltages Vds1 and Vds2. A resonance frequency fr of a multi-resonance circuit including electromagnetic field coupling is designed to be slightly lower than 6.78 MHz or 13.56 MHz, and the multi-resonance circuit has a sufficiently small inductive reactance. The switching elements Q1 and Q2 are alternately turned on and off with a short dead time td therebetween, during which both the switching elements Q1 and Q2 are off. In the dead time td, during which the two switching elements Q1 and Q2 are off, commutation is performed by charging and discharging the capacitors (parasitic capacitances) Cds1 and Cds2 of the two switching elements Q1 and Q2 using a lagging current of a resonance current ir. The ZVS operation is implemented by turning on the switching elements Q1 and Q2 in a conduction period to of the parasitic diode after a commutation period tc. An energy conversion operation in each state during one switching period will now be described.

(1) State 1, Time t1 to t2

On the power transmitting side, in state 1, the switching element Q1 is superficially conducting. For example, when the switching element Q1 is a GaN FET, a reverse voltage −Vds1 is applied to both ends of the switching element Q1, and a voltage (Vgd1) is applied between the gate and the drain. The switching element Q1 enters a reverse conduction mode in which a threshold voltage is an offset voltage, and operates like an antiparallel diode. The diode Dds1, which is an equivalent diode between both ends of the switching element Q1, is conducting, and the ZVS operation is performed by turning on the switching element Q1 in this period. The resonance current ir flows through the power transmitting coil np, and the capacitor Cr is charged.

On the power receiving side, the diode Dds3 or Dds4 is conducting and a resonance current irs flows through the power receiving coils ns1 and ns2. When the diode Dds3 is conducting, the capacitor Crs is discharged, a voltage induced in the power receiving coils ns1 and ns2 and a voltage between both ends of the capacitor Crs are added up, and the resulting voltage (power) is supplied to the load Ro. When the diode Dds4 is conducting, the capacitor Crs is charged. The voltage of the capacitor Co is applied to the load Ro to supply power thereto. When the switching element Q1 is turned off, state 2 is entered.

(2) State 2, Time t2 to t3

By the resonance current ir flowing through the power transmitting coil np, the capacitor Cds1 between both ends of the switching element Q1 is charged and the capacitor Cds2 between both ends of the switching element Q2 is discharged. When the voltage Vds1 becomes the voltage Vi and the voltage Vds2 becomes 0 V, state 3 is entered.

(3) State 3, Time t3 to t4

On the power transmitting side, in state 3, the switching element Q2 is conducting. For example, when the switching element Q2 is a GaN FET, a reverse voltage −Vds2 is applied to both ends of the switching element Q2, and a voltage (Vgd2) is applied between the gate and the drain. The switching element Q2 enters a reverse conduction mode in which a threshold voltage is an offset voltage, and operates like an antiparallel diode. The diode Dds2, which is an equivalent diode between both ends of the switching element Q2, is conducting, and the ZVS operation is performed by turning on the switching element Q2 in this period. The resonance current ir flows through the power transmitting coil np, and the capacitor Cr is discharged.

On the power receiving side, the diode Dds3 or Dds4 is conducting and the resonance current irs flows through the power receiving coils ns1 and ns2. When the diode Dds3 is conducting, the capacitor Crs is discharged, a voltage induced in the power receiving coils ns1 and ns2 and a voltage between both ends of the capacitor Crs are added up, and the resulting power is supplied to the load Ro. When the diode Dds4 is conducting, the capacitor Crs is charged. The voltage of the capacitor Co is applied to the load Ro to supply power thereto. When the switching element Q2 is turned off, state 4 is entered.

(4) State 4, Time t4 to t1

By the resonance current ir flowing through the power transmitting coil np, the capacitor Cds1 between both ends of the switching element Q1 is discharged and the capacitor Cds2 between both ends of the switching element Q2 is charged. When the voltage Vds1 becomes 0 V and the voltage Vds2 becomes the voltage Vi, state 1 is entered again. Thereafter, states 1 to 4 are periodically repeated.

In the power receiving circuit, the diode Dds3 or Dds4 conducts and a current flows in a forward direction. In a periodic stationary operation, the waveforms of the currents ir and irs become substantially sinusoidal because of a resonance phenomenon.

By a mutual inductance Ml and a mutual capacitance Mc equivalently formed between the power transmitting coil np and the power receiving coils ns1 and ns2, an equivalent electromagnetic field resonance coupling circuit is formed, and the power transmitting resonance mechanism and the power receiving resonance mechanism resonate to form an electromagnetic resonance field.

As mentioned above, FIG. 2(A) is a circuit diagram of a multi-resonance circuit that includes the electromagnetic field resonance coupling circuit 90 and equivalent electromagnetic field resonance coupling formed by the resonance capacitors Cr and Crs, and FIG. 2(B) is an equivalent circuit diagram of the multi-resonance circuit. In these examples, an inductance Lp is the inductance of the power transmitting coil np, an inductance Ls is the inductance of the power receiving coil ns1 (ns2), and an inductance Lm is an equivalent mutual inductance that transfers power using magnetic field resonance coupling between the power transmitting coil np and the power receiving coil ns1 (ns2). A capacitance Cm is an equivalent mutual capacitance that transfers power using electric field resonance coupling between the power transmitting coil np and the power receiving coil ns1 (ns2). A capacitance Cp is a parasitic component of the power transmitting coil np, and capacitances Cs and Cs1 are parasitic components of the power receiving coil ns1 (ns2).

Because of the resonance phenomenon, an input current iac in (t) to the electromagnetic field resonance coupling circuit can be approximately expressed by the following equation, where the amplitude of the resonance current is Iac, such that $$iac\ in(t) = Iac\ \sin(\omega_s t)$$

where $\omega_s = 2\pi/T_s$

A sinusoidal current iac in (t) is applied between terminals 1 and 1'. Although a current including various frequency components attempts to flow between the terminals 1 and 1', current waveforms of higher-order frequency components corresponding to large impedances are blocked by the electromagnetic field resonance coupling circuit. By performing a resonance operation, only a resonance current waveform mainly including switching frequency components is allowed to flow, and power can be efficiently transferred.

Figure 4:
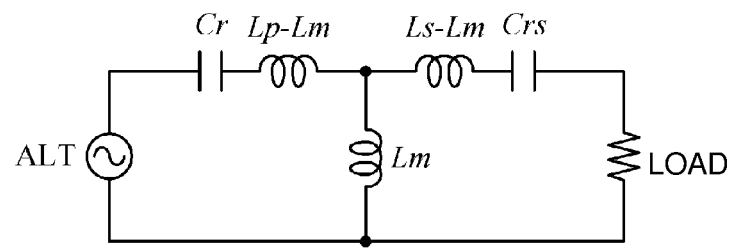
FIG. 4 is an equivalent circuit diagram for explaining how the frequency response of a voltage gain, which is the ratio of direct-current output voltage to direct-current input voltage, varies depending on the equivalent resistance value of a load.

FIG. 4 is an equivalent circuit diagram for explaining how the frequency response of a voltage gain, which is the ratio of direct-current output voltage to direct-current input voltage, varies depending on the equivalent resistance value of the load.

When the impedance of a power-transmitting alternating current voltage generating circuit ALT is small enough to be negligible, a first resonance circuit including the resonance capacitor Cr and an inductor {(Lp−Lm)+Lm} is formed. When the equivalent resistance value of the load is small, a second resonance circuit including the resonance capacitor Crs and the inductor {(Ls−Lm)+Lm} is formed.

Thus, since two resonance circuits exist and are coupled through the mutual inductance Lm, a composite resonance circuit is formed and resonant modes (even mode and odd mode) occur.

When the inductance of the power transmitting coil and the inductance of the power receiving coil are both represented by L and the resonance capacitors Cr and Crs are both represented by C, the following two resonant frequencies f1' and f1" occur, such that $$f1' = 1/(2\pi\sqrt{(L+Lm)C})$$

$$f1'' = 1/(2\pi\sqrt{(L-Lm)C})$$

The mutual inductance Lm formed by coupling between the power transmitting coil np and the power receiving coil ns1 (ns2) satisfies the following relationship:

$$Lm = k\sqrt{(Lp \cdot Ls)}$$

where k is a coupling coefficient.

Figure 5A:
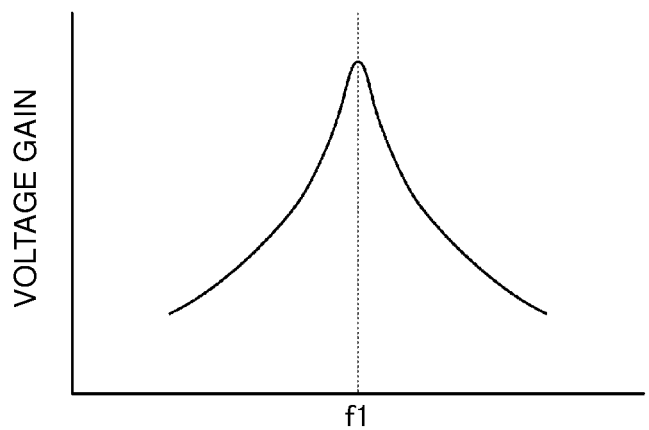
FIGS. 5(A), 5(B), and 5(C) are schematic diagrams each illustrating resonance characteristics of multiple resonance.
Figure 5B:
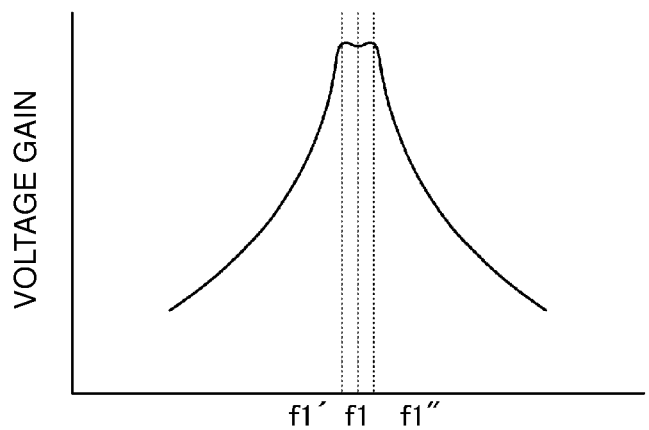
Figure 5C:
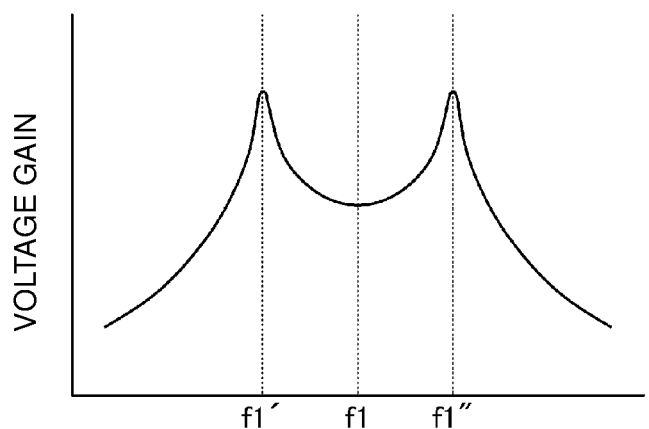

FIGS. 5(A), 5(B), and 5(C) are schematic diagrams each illustrating resonance characteristics of the multiple resonance. In each diagram, the horizontal axis represents frequency and the vertical axis represents voltage gain, which is the ratio of direct-current output voltage to direct-current input voltage. FIG. 5(A) shows a single-peaked curve obtained when the mutual inductance Lm≈0. FIG. 5(C) shows a double-peaked curve obtained when the mutual inductance Lm is large. FIG. 5(B) shows a substantially single-peaked curve obtained when the mutual inductance Lm is medium.

Since multiple resonance does not occur when the equivalent resistance value of the load shown in FIG. 4 is large, a single-peaked curve is obtained, where resonance occurs at the resonant frequency of the first resonance circuit.

Therefore, when the equivalent resistance value of the load is small and the coupling coefficient (degree of coupling) k is large, a voltage gain, which is the ratio of direct-current output voltage to direct-current input voltage, is double-peaked, whereas when the equivalent resistance value of the load is large or the coupling coefficient (degree of coupling) k is small, the voltage gain is single-peaked.

Figure 6:
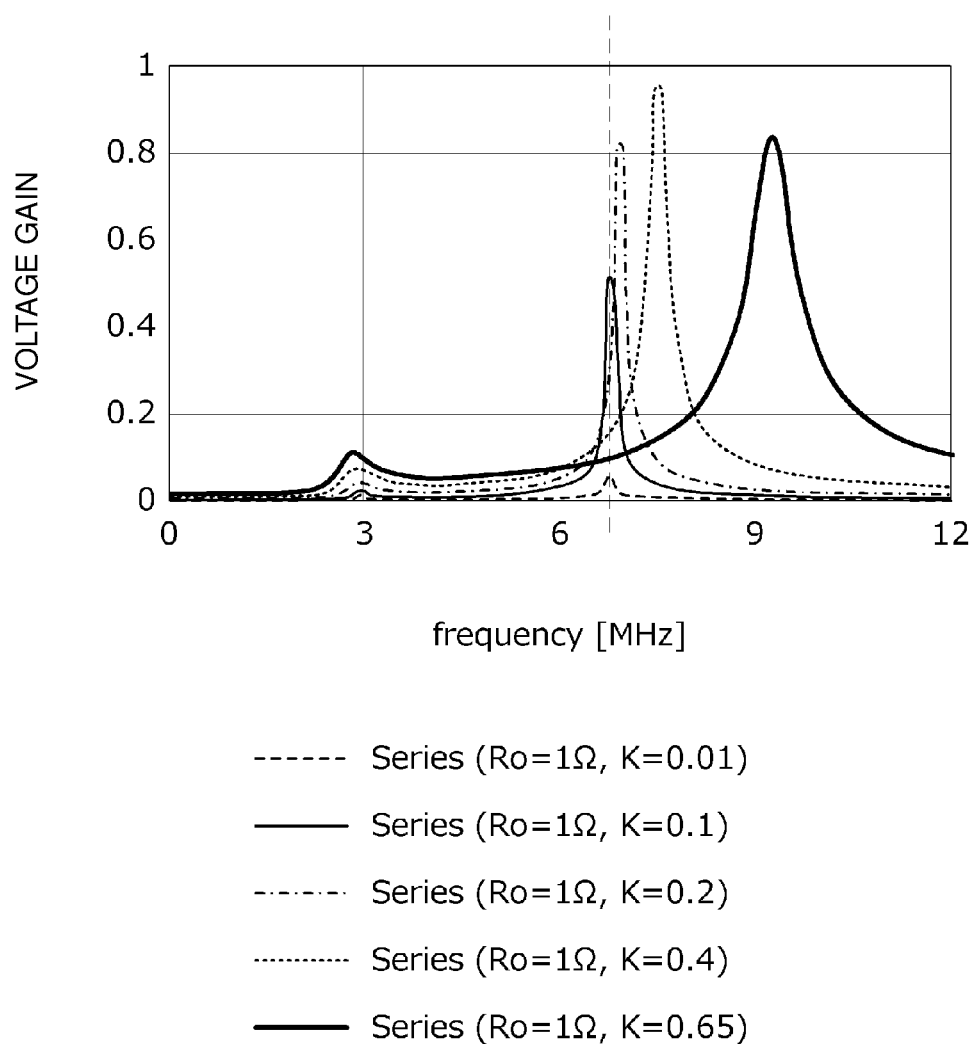
FIG. 6 is a diagram illustrating the frequency responses of voltage gains obtained when the equivalent resistance value of a load is 1Ω (small value)
Figure 7:
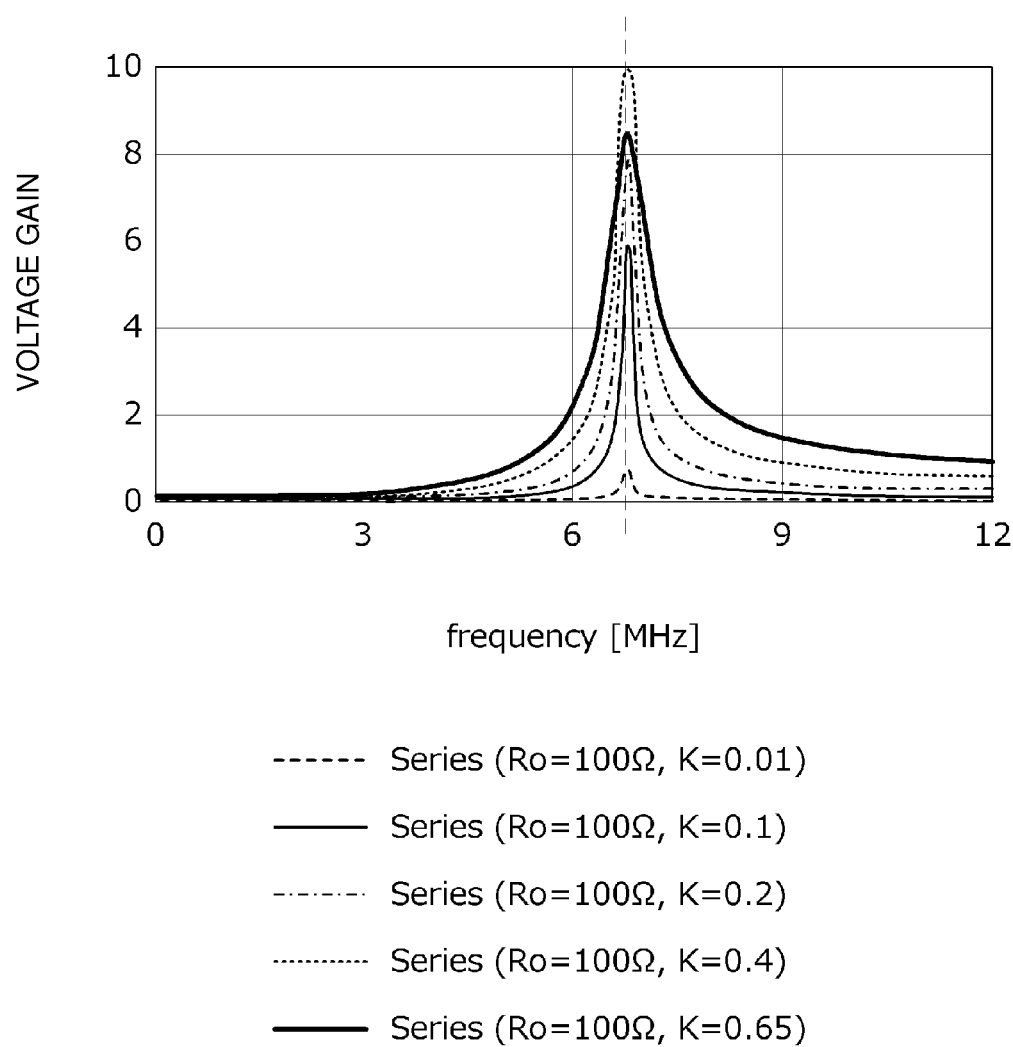
FIG. 7 is a diagram illustrating the frequency responses of voltage gains obtained when the equivalent resistance value of the load is 100Ω (large value)

FIGS. 6 and 7 are diagrams each illustrating the frequency responses of voltage gains obtained by varying the coupling coefficient between the power transmitting coil np and the power receiving coil ns. FIG. 6 illustrates responses obtained when the equivalent resistance value of the load Ro is 1Ω (small value), and FIG. 7 illustrates responses obtained when the equivalent resistance value of the load Ro is 100Ω (large value). In both cases, the coupling coefficient k is varied from 0.01 to 0.65 in five steps.

When the equivalent resistance value of the load is small in the wireless power transfer system where the power receiving rectifier circuit is configured in series with the power receiving resonance mechanism as in the present embodiment, the multiple resonance described above occurs and the frequency response of the voltage gain may be double-peaked, as shown in FIG. 6.

Accordingly, for the power receiving device in which the equivalent resistance value of the load is small, (1) When received power is small, the degree of coupling is reduced (e.g., k=0.65→0.1) to bring the resonance frequency close to the operating frequency 6.78 MHz. This increases the received power.

(2) To avoid reception of excessive power, the degree of coupling is increased (e.g., k=0.1→0.65) to separate the resonance frequency from the operating frequency. This reduces the received power.

On the other hand, when the equivalent resistance value is large, the multiple resonance does not occur, and the frequency response of the voltage gain tends to be single-peaked as shown in FIG. 7.

Accordingly, for the power receiving device in which the equivalent resistance value of the load is large, (3) When received power is small, the degree of coupling is increased (e.g., k=0.2→0.65) to increase the voltage gain, thereby increasing the received power.

(4) To avoid reception of excessive power, the degree of coupling is reduced (e.g., k=0.65→0.2) to reduce the voltage gain, thereby reducing the received power.

The equivalent resistance value of the load of the first power receiving device PRU1 illustrated in FIG. 1(A) is small enough that the frequency response of the voltage gain obtained when the first power receiving device PRU1 and the power transmitting device PSU are coupled is double-peaked. The equivalent resistance value of the load of the second power receiving device PRU2 illustrated in FIG. 1(B) is large enough that the frequency response of the voltage gain obtained when the second power receiving device PRU2 and the power transmitting device PSU are coupled is single-peaked.

Therefore, for the first power receiving device PRU1, by setting the coupling coefficient between the power receiving coil ns1 and the power transmitting coil np, the voltage gain is determined by the positional relationship between one of the frequencies at which the voltage gain is maximum (i.e., in the example illustrated in FIG. 6, the higher of two frequencies at which the voltage gain is maximum) and the operating frequency. For the second power receiving device PRU2, a frequency at which the voltage gain is maximum is determined close to the operating frequency, and the voltage gain is determined by setting the coupling coefficient.

The coupling coefficients described above are determined by the distances dx1 and dx2 of the power receiving coils ns1 and ns2 to the power transmitting coil np (i.e., inter-coil distances dx1 and dx2). In the example illustrated in FIGS. 1(A) and 1(B), where the inter-coil distance dx1 is larger than the inter-coil distance dx2, the coupling coefficient between the power receiving coil ns1 of the first power receiving device and the power transmitting coil np is smaller than the coupling coefficient between the power receiving coil ns2 of the second power receiving device and the power transmitting coil np.

As described above, even when the power receiving coils have the same size, the coupling coefficient can be set for each power receiving device by the distance between the power receiving coil and the power transmitting coil.

In the example described above, the first power receiving device having the load with a small equivalent resistance value determines the voltage gain by using characteristics where the frequency of the peak on the high-frequency side of the double-peaked curve shown in FIG. 6 (i.e., the peak on the side where the peak frequency is relatively significantly displaced by varying the coupling coefficient) is displaced depending on the coupling coefficient, whereas the second power receiving device having the load with a large equivalent resistance value determines the voltage gain by using characteristics where the peak value (voltage gain) of the single-peaked curve shown in FIG. 7 is changed depending on the coupling coefficient. Alternatively, the first power receiving device having the load with a small equivalent resistance value may determine the voltage gain by using characteristics where the value of the peak on the low-frequency side of the double-peaked curve shown in FIG. 6 (i.e., the peak on the side where the peak frequency is less significantly displaced by varying the coupling coefficient) is changed depending on the coupling coefficient.

Second Embodiment

A second embodiment illustrates another setting configuration of the coupling coefficient between the power transmitting coil and the power receiving coil.

Figure 8A:
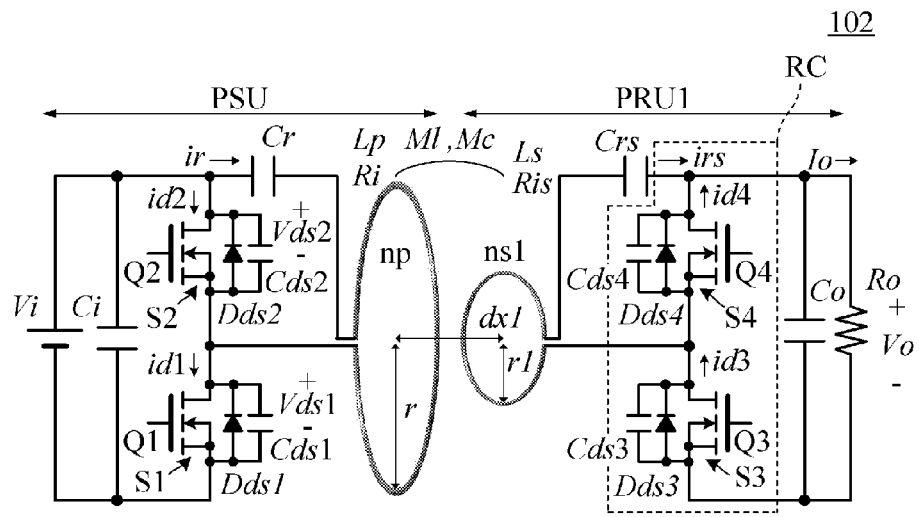
FIGS. 8(A) and 8(B) are each a circuit diagram of a wireless power transfer system according to a second embodiment.
Figure 8B:
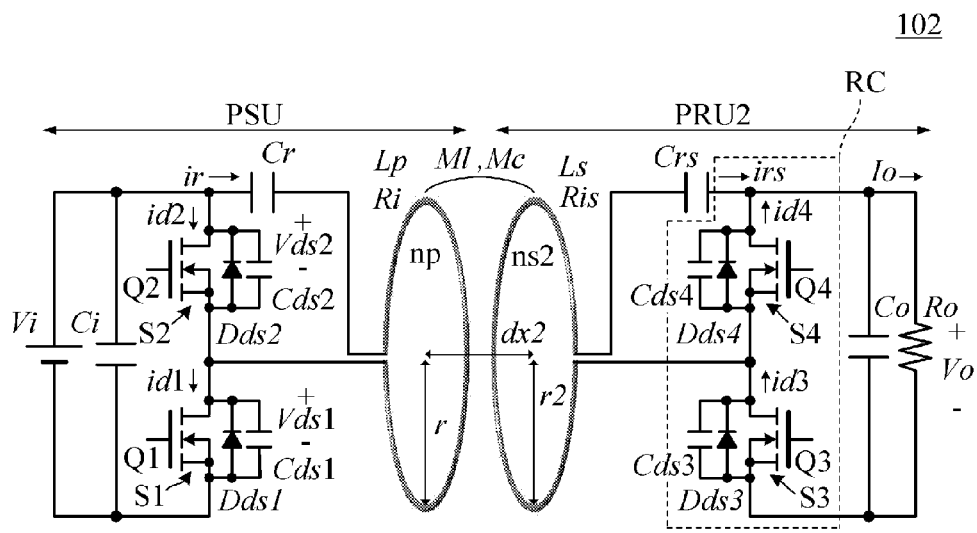

FIGS. 8(A) and 8(B) are each a circuit diagram of a wireless power transfer system 102 according to the second embodiment. The wireless power transfer system 102 includes the power transmitting device PSU, the first power receiving device PRU1, and the second power receiving device PRU2.

A difference between a radius r1 of the power receiving coil ns1 of the first power receiving device PRU1 and a radius r of the power transmitting coil np is smaller than a difference between a radius r2 of the power receiving coil ns2 of the second power receiving device PRU2 and the radius r of the power transmitting coil np. Generally, the larger the difference between the diameters of two coils to be coupled, the smaller the coupling coefficient between the coils. In the present embodiment, the distance dx between the power transmitting coil np of the power transmitting device PSU and the power receiving coil ns1 of the first power receiving device PRU1 is the same as the distance dx between the power transmitting coil np of the power transmitting device PSU and the power receiving coil ns2 of the second power receiving device PRU2. The other configurations are the same as those described in the first embodiment.

As in the present embodiment, the coupling coefficient between the power receiving coil and the power transmitting coil may be determined by the difference in the size of the power receiving coil with respect to the power transmitting coil. Thus, even when the distance between the power transmitting coil and each power receiving coil is the same, the coupling coefficient can be easily set for each power receiving device.

Third Embodiment

A third embodiment illustrates the power transmitting coil and the power receiving coil of a type different from that in the first and second embodiments.

Figure 9A:
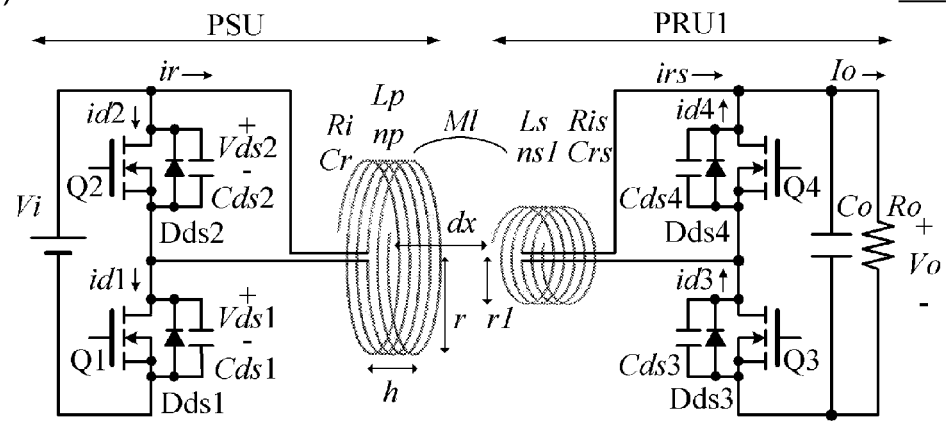
FIGS. 9(A), 9(B), and 9(C) are each a circuit diagram of a wireless power transfer system according to a third embodiment.
Figure 9B:
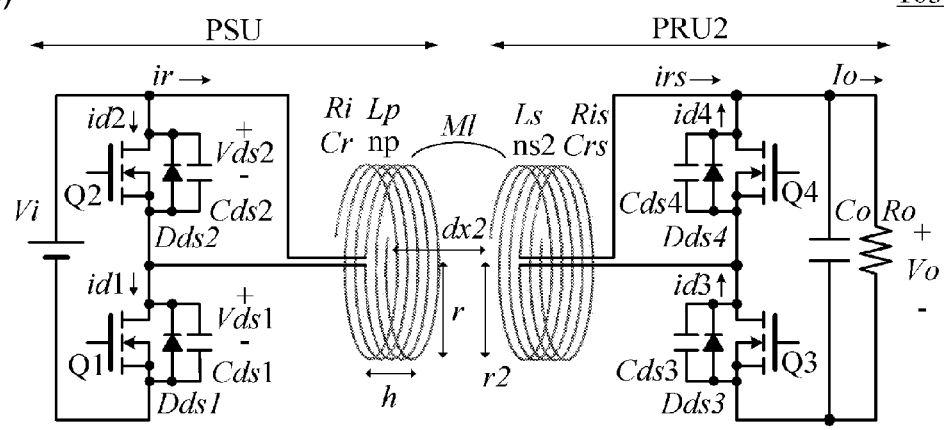
Figure 9C:
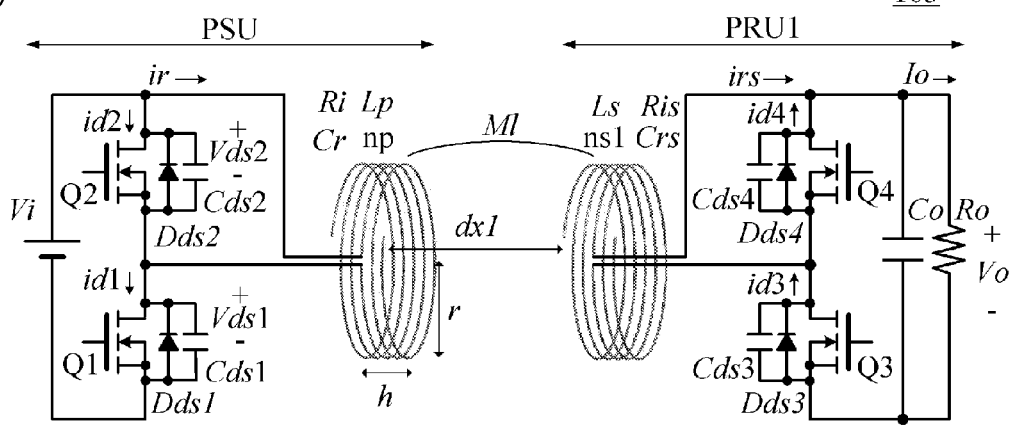

FIGS. 9(A), 9(B), and 9(C) are each a circuit diagram of a wireless power transfer system 103 according to the third embodiment. In this example, helical coils are used as the power transmitting coil np and the power receiving coils ns1 and ns2, and power is transferred in the center of each coil. Therefore, the helical coil on the power transmitting device side has the equivalent inductance Lp and the equivalent capacitance Cr to form a resonance circuit. Similarly, the helical coil on the power receiving device side has the inductance Ls and the capacitance Crs to form a resonance circuit. Since the winding axes of the two helical coils are substantially in alignment (i.e., the two helical coils are substantially coaxial), an electromagnetic field resonance coupling circuit is formed between the power transmitting coil np and each of the power receiving coils ns1 and ns2. The other configurations are the same as those described in the first embodiment.

As described above, electric field energy and magnetic field energy are mutually exchanged between the power transmitting resonance mechanism and the power receiving resonance mechanism.

The difference between the radius r1 of the power receiving coil ns1 of the first power receiving device PRU1 and the radius r of the power transmitting coil np illustrated in FIG. 9(A) is larger than the difference between the radius r2 of the power receiving coil ns2 of the second power receiving device PRU2 and the radius r of the power transmitting coil np illustrated in FIG. 9(B). The inter-coil distance between the power receiving coil ns1 of the first power receiving device PRU1 and the power transmitting coil np illustrated in FIG. 9(C) is larger than the inter-coil distance between the power receiving coil ns2 of the second power receiving device PRU2 and the power transmitting coil np illustrated in FIG. 9(B).

As described above, even when the power transmitting coil and the power receiving coil are helical coils, the coupling coefficient between the power receiving coil and the power transmitting coil can be determined by the difference in coil size or the inter-coil distance.

Fourth Embodiment

A fourth embodiment illustrates another power receiving resonance mechanism.

Figure 10:
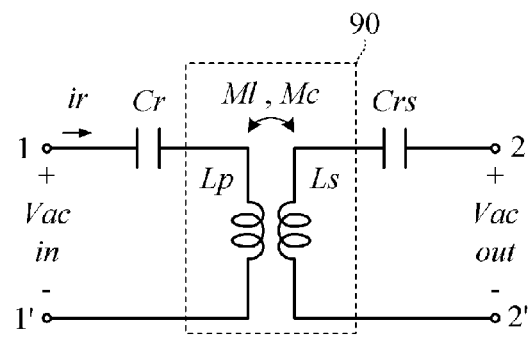
FIG. 10 is a circuit diagram of a resonance circuit that includes the electromagnetic field resonance coupling circuit and equivalent electromagnetic field resonance coupling formed by the resonance capacitors in a wireless power transfer system according to a fourth embodiment.

FIG. 10 is a circuit diagram of a resonance circuit that includes the electromagnetic field resonance coupling circuit 90 and equivalent electromagnetic field resonance coupling formed by the resonance capacitors Cr and Crs in a wireless power transfer system according to the fourth embodiment. Although the power receiving coil includes the capacitor Cs, which is a parasitic component, in the first to third embodiments, the capacitor Cs and the like are not essential as illustrated in FIG. 10. It is only necessary that the inductance Ls of the power receiving coil and the capacitance Crs be connected in series to form a series resonance circuit.

Fifth Embodiment

A fifth embodiment illustrates an example where a filter circuit is provided between the series resonance circuit and the power receiving rectifier circuit.

Figure 11A:
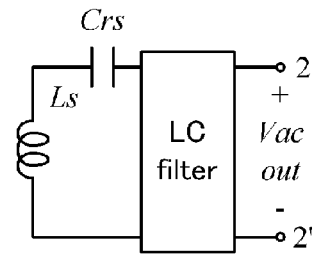
FIGS. 11(A) and 11(B) each illustrate an example where an LC filter circuit is connected to a series resonance circuit of an inductance of a power receiving coil and a capacitance in a wireless power transfer system according to a fifth embodiment.
Figure 11B:
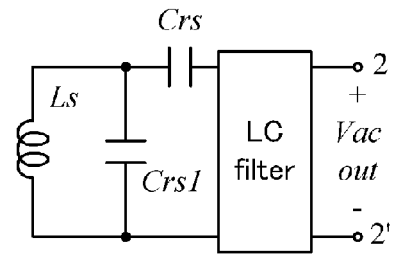

FIG. 11(A) illustrates an example where an LC filter circuit is connected to the series resonance circuit of the inductance Ls of the power receiving coil and the capacitance Crs. FIG. 11(B) is a diagram of a circuit formed by adding, to the configuration of FIG. 11(A), the capacitance Crs parallel to the power receiving coil. In both cases, the power receiving rectifier circuit is connected between terminals 2 and 2'. The LC filter circuit is a low pass filter or band pass filter that passes the operating frequency and blocks harmonic components higher than the operating frequency.

As described above, with the LC filter circuit between the series resonance circuit of the power receiving device and the power receiving rectifier circuit, it is possible to reduce harmonic components of the waveform of current flowing through the power receiving resonance mechanism and reduce electromagnetic interference (EMI) noise. This can improve electromagnetic compatibility (EMC) with other electronic devices. For example, interference with radio communication devices can be suppressed. Also, the filter can convert the impedance of the resonance mechanism. That is, impedance matching can be achieved. This makes it possible to supply current and voltage suitable for the load.

Sixth Embodiment

A sixth embodiment illustrates a wireless power transfer system where the power receiving rectifier circuit is configured in parallel to the power receiving resonance mechanism and configured such that electric energy of the power receiving coil is supplied to the load.

Figure 12A:
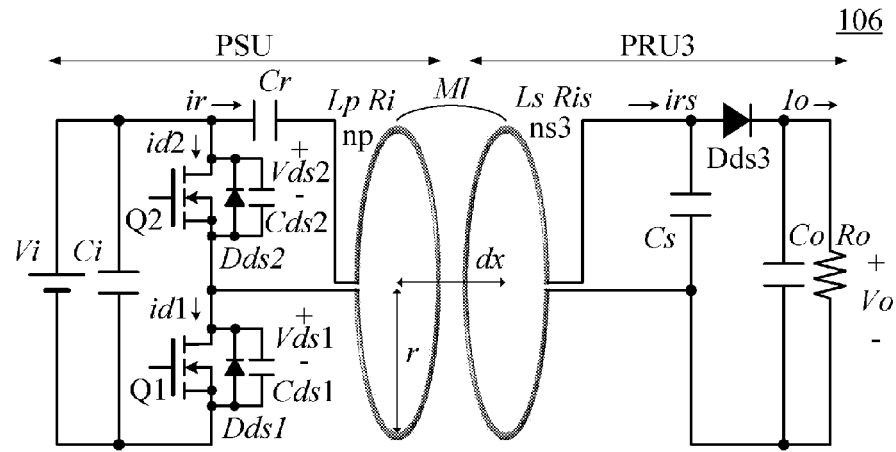
FIGS. 12(A), 12(B), and 12(C) are each a circuit diagram of a wireless power transfer system according to a sixth embodiment.
Figure 12B:
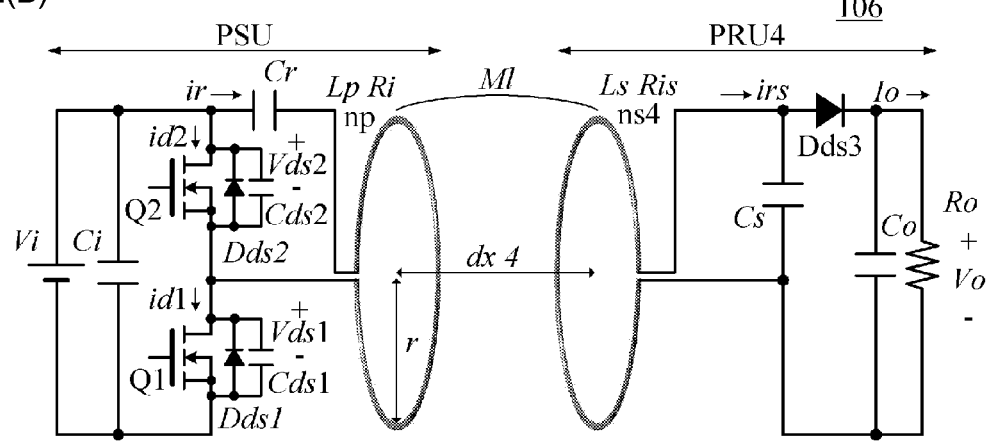
Figure 12C:
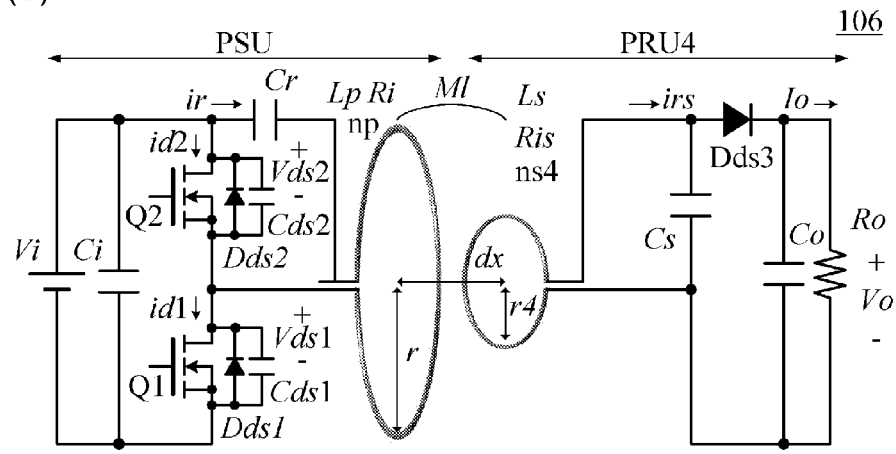

FIGS. 12(A), 12(B), and 12(C) are each a circuit diagram of a wireless power transfer system 106 according to the sixth embodiment. The wireless power transfer system 106 includes the power transmitting device PSU, a third power receiving device PRU3, and a fourth power receiving device PRU4.

The wireless power transfer system 106 is a system that includes the input power source Vi at the input portion of the power transmitting device PSU and supplies a stable direct-current voltage to the load Ro of each of the third power receiving device PRU3 and the fourth power receiving device PRU4.

The configuration of the power transmitting device PSU is the same as that described in the first to fifth embodiments.

The power receiving devices PRU3 and PRU4 each include the power receiving resonance mechanism including a corresponding one of the power receiving coils ns3 and ns4 and the power receiving resonance capacitor Cs, the power receiving rectifier circuit connected to the corresponding one of the power receiving coils ns3 and ns4 and formed by the diode Dds3 that rectifies an alternating current generated in the corresponding one of the power receiving coils ns3 and ns4, and the smoothing capacitor Co.

Figure 13A:
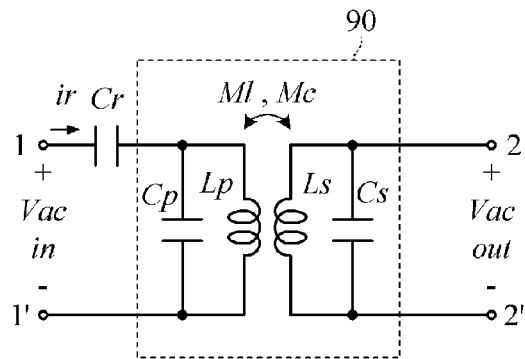
FIG. 13(A) is a circuit diagram of a multi-resonance circuit that includes the electromagnetic field resonance coupling circuit and equivalent electromagnetic field resonance coupling formed by resonance capacitors.
Figure 13B:
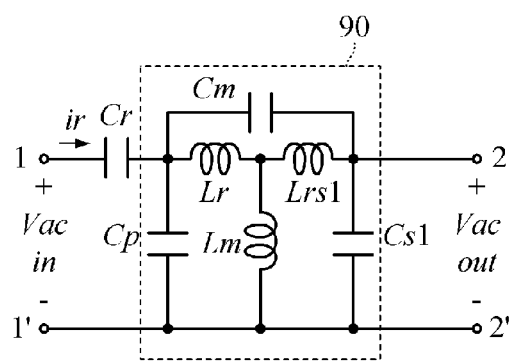
FIG. 13(B) is an equivalent circuit diagram of the multi-resonance circuit.

FIG. 13(A) is a circuit diagram of a multi-resonance circuit that includes the electromagnetic field resonance coupling circuit 90 and equivalent electromagnetic field resonance coupling formed by the resonance capacitor Cr. FIG. 13(B) is an equivalent circuit diagram of the multi-resonance circuit. Here, the inductance Lp is the inductance of the power transmitting coil np, the inductance Ls is the inductance of the power receiving coil ns3 (ns4), and the inductance Lm is an equivalent mutual inductance that transfers power using magnetic field resonance coupling between the power transmitting coil np and the power receiving coil ns3 (ns4). The capacitance Cm is an equivalent mutual capacitance that transfers power using electric field resonance coupling between the power transmitting coil np and the power receiving coil ns3 (ns4). The capacitance Cp is a parasitic component of the power transmitting coil np, and the capacitances Cs and Cs1 are parasitic components of the power receiving coil ns3 (ns4).

As described in the first embodiment, a sinusoidal current iac in (t) is applied between the terminals 1 and 1'. Although a current including various frequency components attempts to flow between the terminals 1 and 1', current waveforms of higher-order frequency components corresponding to large impedances are blocked by the electromagnetic field resonance coupling circuit. By performing a resonance operation, only a resonance current mainly including switching frequency components is allowed to flow, and power can be efficiently transferred.

Figure 14:
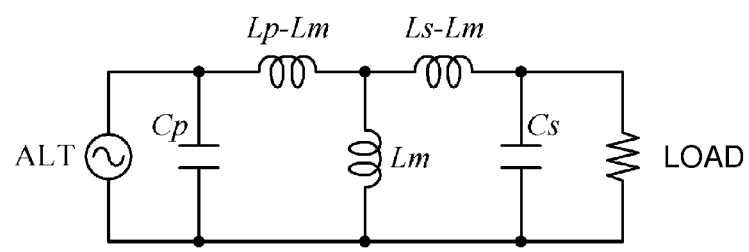
FIG. 14 is an equivalent circuit diagram for explaining how the frequency response of a voltage gain, which is the ratio of direct-current output voltage to direct-current input voltage, varies depending on the equivalent resistance value of a load.

FIG. 14 is an equivalent circuit diagram for explaining how the frequency response of a voltage gain, which is the ratio of direct-current output voltage to direct-current input voltage, varies depending on the equivalent resistance value of the load.

The first resonance circuit including the resonance capacitor Cp and the inductor $\{(Lp-Lm)+Lm\}$ is formed. When the equivalent resistance value of the load is large, the second resonance circuit including the resonance capacitor Cs and the inductor $\{(Ls-Lm)+Lm\}$ is formed.

Thus, since two resonance circuits exist and are coupled through the mutual inductance Lm, a composite resonance circuit is formed and resonant modes (even mode and odd mode) occur.

When the inductance of the power transmitting coil and the inductance of the power receiving coil are both represented by L and the resonance capacitors Cp and Cs are both represented by C, the following two resonant frequencies occur.

$$f1'=1/(2\pi\sqrt{(L+Lm)C})$$

$$f1''=1/(2\pi\sqrt{(L-Lm)C})$$

The mutual inductance Lm formed by coupling between the power transmitting coil np and the power receiving coil ns3 or ns4 satisfies the following relationship:

$$Lm=k\sqrt{(Lp\cdot Ls)} \text{ where } k \text{ is a coupling coefficient.}$$

Therefore, as in the example illustrated in FIGS. 5(A), 5(B), and 5(C) in the first embodiment, the frequency response of the voltage gain is either a single-peaked or double-peaked response depending on the mutual inductance Lm. Since multiple resonance does not occur when the equivalent resistance value of the load shown in FIG. 14 is small, a single-peaked response is obtained, where resonance occurs at the resonant frequency of the first resonance circuit.

Accordingly, when the equivalent resistance value of the load is large and the coupling coefficient (degree of coupling) k is large, a voltage gain, which is the ratio of direct-current output voltage to direct-current input voltage, is double-peaked, whereas when the equivalent resistance value of the load is small or the coupling coefficient (degree of coupling) k is small, the voltage gain is single-peaked.

Figure 15:
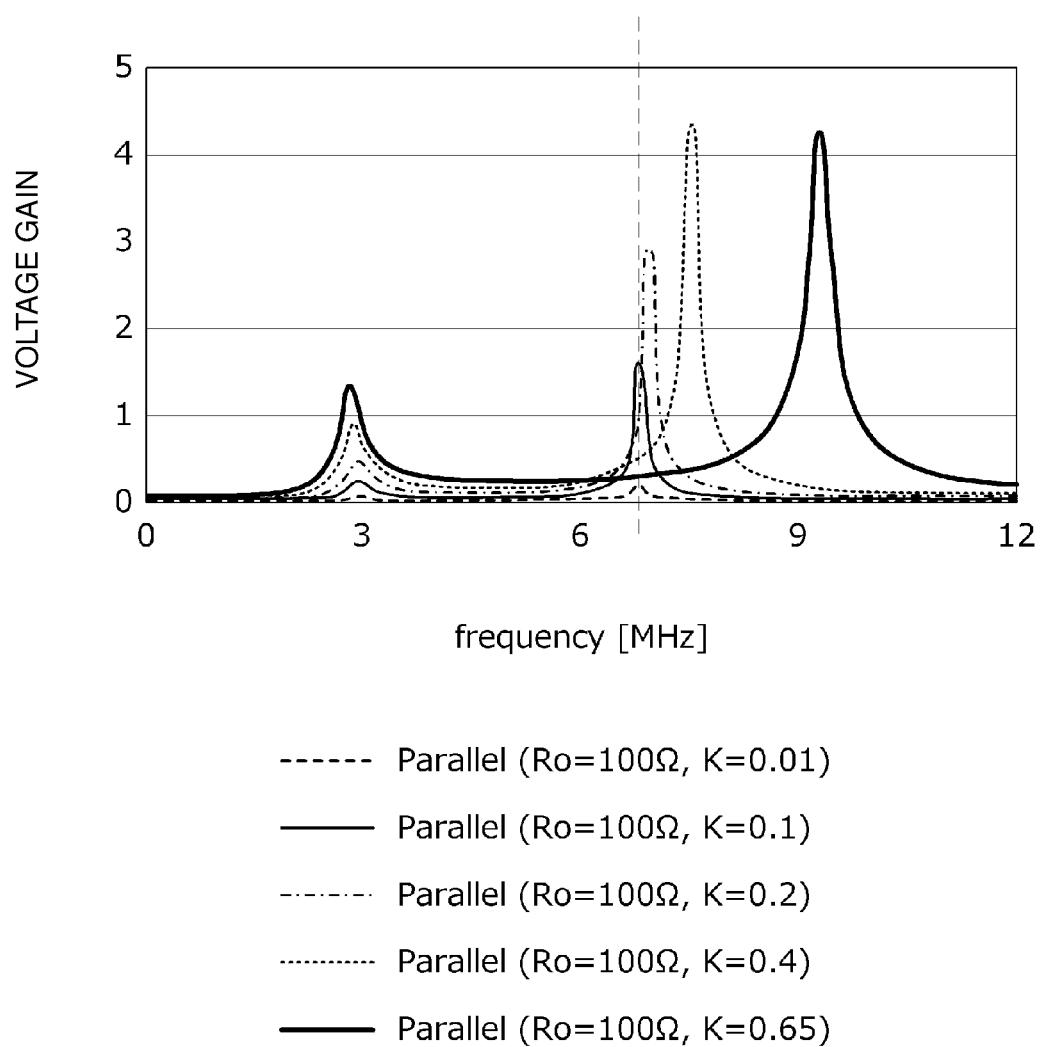
FIG. 15 is a diagram illustrating the frequency responses of voltage gains obtained when the equivalent resistance value of the load is 100Ω (large value)
Figure 16:
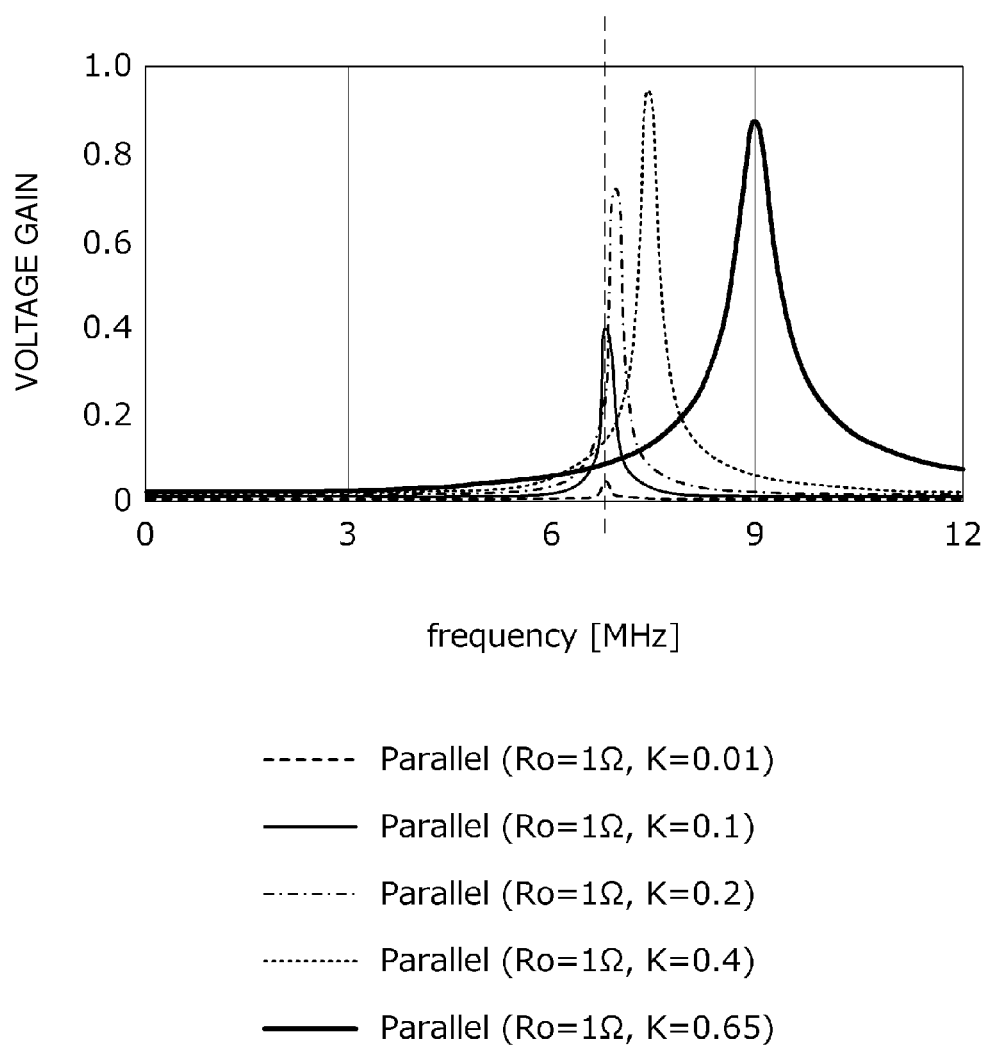
FIG. 16 is a diagram illustrating the frequency responses of voltage gains obtained when the equivalent resistance value of the load is 1Ω (small value)

FIGS. 15 and 16 are diagrams each illustrating the frequency responses of voltage gains obtained by varying the coupling coefficient between the power transmitting coil np and the power receiving coil ns. FIG. 15 illustrates responses obtained when the equivalent resistance value of the load Ro is 100Ω (large value), and FIG. 16 illustrates responses obtained when the equivalent resistance value of the load Ro is 1Ω (small value). In both cases, the coupling coefficient k is varied from 0.01 to 0.65 in five steps.

When the equivalent resistance value of the load is large in the wireless power transfer system where the power receiving rectifier circuit is configured in parallel to the power receiving resonance mechanism as in the present embodiment, the multiple resonance described above occurs and the frequency response of the voltage gain may be double-peaked, as shown in FIG. 15.

Accordingly, for the power receiving device in which the equivalent resistance value of the load is large, (1) When received power is small, the degree of coupling is reduced (e.g., k=0.65→0.2) to bring the resonance frequency close to the operating frequency 6.78 MHz. This increases the received power.

(2) To avoid reception of excessive power, the degree of coupling is increased (e.g., k=0.2→0.65) to separate the resonance frequency from the operating frequency. This reduces the received power.

On the other hand, when the equivalent resistance value is small, the multiple resonance does not occur, and the frequency response of the voltage gain is single-peaked as shown in FIG. 16.

Accordingly, for the power receiving device in which the equivalent resistance value of the load is small, (3) When received power is small, the degree of coupling is reduced (e.g., k=0.65→0.2) to increase the voltage gain, thereby increasing the received power.

(4) To avoid reception of excessive power, the degree of coupling is increased (e.g., k=0.2→0.65) to reduce the voltage gain, thereby reducing the received power.

The equivalent resistance value of the load of the power receiving device PRU3 illustrated in FIG. 12(A) is large enough that the frequency response of the voltage gain obtained when the power receiving device PRU3 and the power transmitting device PSU are coupled is double-peaked. The equivalent resistance value of the load of the power receiving device PRU4 illustrated in FIGS. 12(B) and 12(C) is small enough that the frequency response of the voltage gain obtained when the power receiving device PRU4 and the power transmitting device PSU are coupled is single-peaked.

Therefore, for the third power receiving device PRU3, by setting the coupling coefficient between the power receiving coil ns1 and the power transmitting coil np, the voltage gain is determined by the positional relationship between one of the frequencies at which the voltage gain is maximum (i.e., in the example illustrated in FIG. 15, the higher of two frequencies at which the voltage gain is maximum) and the operating frequency. For the fourth power receiving device PRU4, a frequency at which the voltage gain is maximum is determined close to the operating frequency, and the voltage gain is determined by setting the coupling coefficient.

The coupling coefficients described above are determined by the distances dx and dx4 of the power receiving coils ns3 and ns4 to the power transmitting coil np (i.e., inter-coil distances dx and dx4), or by the difference between the radius r of the power transmitting coil np and a radius r4 of the power receiving coil ns4.

In the example described above, the third power receiving device having the load with a large equivalent resistance value determines the voltage gain by using characteristics where the frequency of the peak on the high-frequency side of the double-peaked curve shown in FIG. 15 (i.e., the peak on the side where the peak frequency is relatively significantly displaced by varying the coupling coefficient) is displaced depending on the coupling coefficient, whereas the fourth power receiving device having the load with a small equivalent resistance value determines the voltage gain by using characteristics where the frequency of the single peak shown in FIG. 16 is displaced depending on the coupling coefficient. Alternatively, the third power receiving device having the load with a large equivalent resistance value may determine the voltage gain by using characteristics where the value of the peak on the low-frequency side of the double-peaked curve shown in FIG. 15 (i.e., the peak on the side where the peak frequency is less significantly displaced by varying the coupling coefficient) is changed depending on the coupling coefficient.

Seventh Embodiment

A seventh embodiment illustrates another power receiving resonance mechanism.

Figure 17:
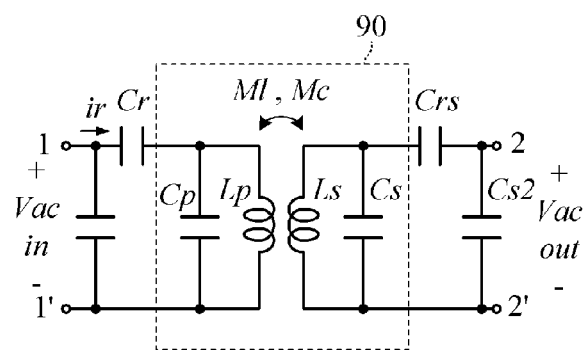
FIG. 17 is a circuit diagram of an electromagnetic field resonance coupling circuit portion of a wireless power transfer system according to a seventh embodiment.

FIG. 17 is a circuit diagram of an electromagnetic field resonance coupling circuit portion of a wireless power transfer system according to the seventh embodiment. In this example, the capacitors Cr, Crs, and Cs2 are added to the electromagnetic field resonance coupling circuit 90. With the capacitors Cr, Crs, and Cs2 formed by electronic components, the value of voltage applied to each capacitor or coil can be adjusted. Moreover, for example, by dividing the voltage between the capacitors Crs and Cs2, power taken out of the capacitor Cs2 to be supplied to the load can be adjusted.

Eighth Embodiment

An eighth embodiment illustrates another power receiving resonance mechanism.

Figure 18:
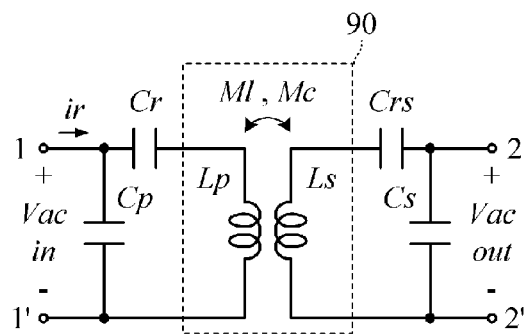
FIG. 18 is a circuit diagram of an electromagnetic field resonance coupling circuit portion of a wireless power transfer system according to an eighth embodiment.

FIG. 18 is a circuit diagram of an electromagnetic field resonance coupling circuit portion of a wireless power transfer system according to the eighth embodiment. In this example, the capacitor Cr is inserted between the inductance Lp of the power transmitting coil and the resonance capacitor Cp, and the capacitor Crs is inserted between the inductance Ls of the power receiving coil and the resonance capacitor Cs. With the capacitors Cr, Crs, and Cs2 formed by electronic components, the value of voltage applied to each capacitor or coil can be adjusted. Moreover, for example, by dividing the voltage between the capacitors Crs and Cs, power taken out of the capacitor Cs to be supplied to the load can be adjusted.

Ninth Embodiment

A ninth embodiment illustrates an example where a filter circuit is provided between a parallel resonance circuit and the power receiving rectifier circuit.

Figure 19A:
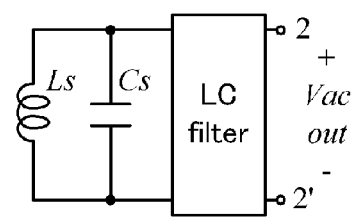
FIGS. 19(A) and 19(B) each illustrate an example where an LC filter circuit is connected to a parallel resonance circuit of the inductance of the power receiving coil and the capacitance in a wireless power transfer system according to a ninth embodiment.
Figure 19B:
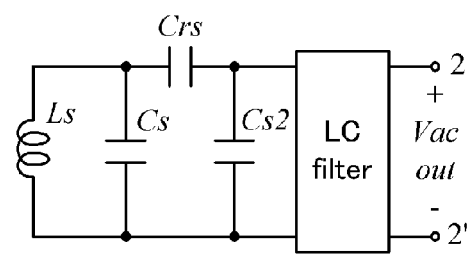

FIG. 19(A) illustrates an example where an LC filter circuit is connected to a parallel resonance circuit of the inductance Ls of the power receiving coil and the capacitance Cs. FIG. 19(B) is a diagram of a circuit obtained by adding the capacitance Crs in series with the circuit of FIG. 19(A) and adding the capacitance Cs2 in parallel to the circuit of FIG. 19(A). In both cases, the power receiving rectifier circuit is connected between the terminals 2 and 2'. The LC filter circuit is a low pass filter or band pass filter that passes the operating frequency and blocks harmonic components higher than the operating frequency.

As described above, with the LC filter circuit between the series resonance circuit of the power receiving device and the power receiving rectifier circuit, it is possible to reduce harmonic components of the waveform of current flowing through the power receiving resonance mechanism and reduce electromagnetic interference (EMI) noise. This can improve electromagnetic compatibility (EMC) with other electronic devices. For example, interference with radio communication devices can be suppressed. Also, the filter can convert the impedance of the resonance mechanism. That is, impedance matching can be achieved. This makes it possible to supply current and voltage suitable for the load.

In the embodiments described above, between the power transmitting coil and the power receiving coil, magnetic field coupling by mutual inductance and electric field coupling by mutual capacitance form electromagnetic field resonance coupling. The present disclosure is also applicable to the case where magnetic field coupling is dominant over electric field coupling and magnetic field coupling is mainly formed.

What is claimed is:

1. A wireless power transfer system comprising:
a power transmitter including a power transmitting coil, a power transmitting resonance capacitor forming a power transmitting resonance mechanism together with the power transmitting coil, and a power-transmitting alternating current voltage generating circuit configured to generate an alternating-current voltage in the power transmitting coil by driving a switching element electrically connected to the power transmitting coil at a predetermined operating frequency to intermittently apply a direct-current input voltage to the power transmitting resonance mechanism; and
a plurality of power receivers, each including a power receiving coil, a power receiving resonance capacitor forming a power receiving resonance mechanism together with the power receiving coil, and a power receiving rectifier circuit connected to the power receiving coil and configured to rectify the alternating-current voltage to a direct-current output voltage;
electric field energy and magnetic field energy of each of the power transmitting resonance mechanism and the power receiving resonance mechanism interact with each other to form an electromagnetic resonance field;
between the power transmitting coil and the power receiving coil, magnetic field coupling by mutual inductance and electric field coupling by mutual capacitance form electromagnetic field resonance coupling; and
power is wirelessly supplied from the power transmitter to the power receivers,
the power receiving rectifier circuit being configured in series with the power receiving resonance mechanism, and configured such that the magnetic field energy of the power receiving resonance mechanism is supplied to a load;
the plurality of power receivers include a first power receiver having a load with a first equivalent resistance value and having a voltage gain whose frequency response is a double-peaked response with two maximum values, the voltage gain being a ratio of the direct-current output voltage to the direct-current input voltage, and a second power receiver having a load with a second equivalent resistance value larger than the first equivalent resistance value and having a voltage gain whose frequency response is a single-peaked response;
for the first power receiver, by setting a coupling coefficient between the power receiving coil of the first power receiver and the power transmitting coil, the voltage gain is determined by a positional relationship between the higher of frequencies corresponding to the two maximum values in the first power receiver and the operating frequency; and
for the second power receiver, a frequency at which the voltage gain is maximum is determined so as to be equal to the operating frequency, and the voltage gain in the second power receiver is determined by setting a coupling coefficient between the power receiving coil of the second power receiver and the power transmitting coil.

2. The wireless power transfer system according to claim 1, wherein the coupling coefficient is determined by a difference in the size or shape of the power receiving coil with respect to the power transmitting coil.

3. The wireless power transfer system according to claim 2, wherein the coupling coefficient is determined by the difference in the size of a radius of the power receiving coil with respect to the size of a radius of the power transmitting coil.

4. The wireless power transfer system according to claim 2, wherein the coupling coefficient is determined by the difference in the shape of the power receiving coil which is helical with respect to the shape of the power transmitting coil which is helical.

5. The wireless power transfer system according to claim 1, wherein the coupling coefficient is determined by a distance of the power receiving coil to the power transmitting coil.

6. A wireless power transfer system comprising:
a power transmitter including a power transmitting coil, a power transmitting resonance capacitor forming a power transmitting resonance mechanism together with the power transmitting coil, and a power-transmitting alternating current voltage generating circuit configured to generate an alternating-current voltage in the power transmitting coil by driving a switching element electrically connected to the power transmitting coil at a predetermined operating frequency to intermittently apply a direct-current input voltage to the power transmitting resonance mechanism; and
a plurality of power receivers, each including a power receiving coil, a power receiving resonance capacitor forming a power receiving resonance mechanism together with the power receiving coil, and a power receiving rectifier circuit connected to the power receiving coil and configured to rectify the alternating-current voltage to a direct-current output voltage;
electric field energy and magnetic field energy of each of the power transmitting resonance mechanism and the power receiving resonance mechanism interact with each other to form an electromagnetic resonance field;
between the power transmitting coil and the power receiving coil, magnetic field coupling by mutual inductance and electric field coupling by mutual capacitance form electromagnetic field resonance coupling; and
power is wirelessly supplied from the power transmitter to the power receivers,
the power receiving rectifier circuit being configured in parallel to the power receiving resonance mechanism, and configured such that the electric field energy of the power receiving resonance mechanism is supplied to a load;
the plurality of power receivers include a third power receiver having a load with a third equivalent resistance value and having a voltage gain whose frequency response is a double-peaked response with two maximum values, the voltage gain being a ratio of the direct-current output voltage to the direct-current input voltage, and a fourth power receiver having a load with a fourth equivalent resistance value smaller than the third equivalent resistance value and having a voltage gain whose frequency response is a single-peaked response;

for the third power receiver, by setting a coupling coefficient between the power receiving coil of the third power receiver and the power transmitting coil, the voltage gain is determined by a positional relationship between the higher of frequencies corresponding to the two maximum values in the third power receiver and the operating frequency; and for the fourth power receiver, by setting a coupling coefficient between the power receiving coil of the fourth power receiver and the power transmitting coil, the voltage gain is determined by a positional relationship between a frequency at which the voltage gain in the fourth power receiver is maximum and the operating frequency.

7. The wireless power transfer system according to claim 6, wherein the coupling coefficient is determined by a difference in the size or shape of the power receiving coil with respect to the power transmitting coil.

8. The wireless power transfer system according to claim 7, wherein the coupling coefficient is determined by the difference in the size of a radius of the power receiving coil with respect to the size of a radius of the power transmitting coil.

9. The wireless power transfer system according to claim 7, wherein the coupling coefficient is determined by the difference in the shape of the power receiving coil which is helical with respect to the shape of the power transmitting coil which is helical.

10. The wireless power transfer system according to claim 6, wherein the coupling coefficient is determined by a distance of the power receiving coil to the power transmitting coil.

11. A wireless power transfer system comprising:
a power transmitter including a power transmitting coil, a power transmitting resonance capacitor forming a power transmitting resonance mechanism together with the power transmitting coil, and a power-transmitting alternating current voltage generating circuit configured to generate an alternating-current voltage in the power transmitting coil by driving a switching element electrically connected to the power transmitting coil at a predetermined operating frequency to intermittently apply a direct-current input voltage to the power transmitting resonance mechanism; and
a plurality of power receivers, each including a power receiving coil, a power receiving resonance capacitor forming a power receiving resonance mechanism together with the power receiving coil, and a power receiving rectifier circuit connected to the power receiving coil and configured to rectify the alternating-current voltage to a direct-current output voltage;
electric field energy and magnetic field energy of each of the power transmitting resonance mechanism and the power receiving resonance mechanism interact with each other to form an electromagnetic resonance field;
between the power transmitting coil and the power receiving coil, magnetic field coupling by mutual inductance and electric field coupling by mutual capacitance form electromagnetic field resonance coupling; and
power is wirelessly supplied from the power transmitter to the power receivers,
the power receiving rectifier circuit being configured in series with the power receiving resonance mechanism, and configured such that the magnetic field energy of the power receiving resonance mechanism is supplied to a load;
the plurality of power receivers include a first power receiver having a load with a first equivalent resistance value and having a voltage gain whose frequency response is a double-peaked response with two maximum values, the voltage gain being a ratio of the direct-current output voltage to the direct-current input voltage, and a second power receiver having a load with a second equivalent resistance value larger than the first equivalent resistance value and having a voltage gain whose frequency response is a single-peaked response;
for the first power receiver, by setting a coupling coefficient between the power receiving coil of the first power receiver and the power transmitting coil, the lower of frequencies corresponding to the two maximum values in the first power receiver is determined so as to be equal to the operating frequency, and the voltage gain in the first power receiver is determined by setting the coupling coefficient between the power receiving coil of the first power receiver and the power transmitting coil; and
for the second power receiver, a frequency at which the voltage gain is maximum is determined so as to be equal to the operating frequency, and the voltage gain in the second power receiver is determined by setting a coupling coefficient between the power receiving coil of the second power receiver and the power transmitting coil.

12. The wireless power transfer system according to claim 11, wherein the coupling coefficient is determined by a difference in the size or shape of the power receiving coil with respect to the power transmitting coil.

13. The wireless power transfer system according to claim 12, wherein the coupling coefficient is determined by the difference in the size of a radius of the power receiving coil with respect to the size of a radius of the power transmitting coil.

14. The wireless power transfer system according to claim 12, wherein the coupling coefficient is determined by the difference in the shape of the power receiving coil which is helical with respect to the shape of the power transmitting coil which is helical.

15. The wireless power transfer system according to claim 11, wherein the coupling coefficient is determined by a distance of the power receiving coil to the power transmitting coil.

16. A wireless power transfer system comprising:
a power transmitter including a power transmitting coil, a power transmitting resonance capacitor forming a power transmitting resonance mechanism together with the power transmitting coil, and a power-transmitting alternating current voltage generating circuit configured to generate an alternating-current voltage in the power transmitting coil by driving a switching element electrically connected to the power transmitting coil at a predetermined operating frequency to intermittently apply a direct-current input voltage to the power transmitting resonance mechanism; and
a plurality of power receivers, each including a power receiving resonance capacitor forming a power receiving resonance mechanism together with the power receiving coil, and a power receiving rectifier circuit connected to the power receiving coil and configured to rectify the alternating-current voltage to a direct-current output voltage;

electric field energy and magnetic field energy of each of the power transmitting resonance mechanism and the power receiving resonance mechanism interact with each other to form an electromagnetic resonance field;

between the power transmitting coil and the power receiving coil, magnetic field coupling by mutual inductance and electric field coupling by mutual capacitance form electromagnetic field resonance coupling; and power is wirelessly supplied from the power transmitter to the power receiver, the power receiving rectifier circuit being configured in parallel to the power receiving resonance mechanism, and configured such that the electric field energy of the power receiving resonance mechanism is supplied to a load;

the plurality of power receivers include a third power receiver having a load with a third equivalent resistance value and having a voltage gain whose frequency response is a double-peaked response with two maximum values, the voltage gain being a ratio of the direct-current output voltage to the direct-current input voltage, and a fourth power receiver having a load with a fourth equivalent resistance value smaller than the third equivalent resistance value and having a voltage gain whose frequency response is a single-peaked response;

for the third power receiver, by setting a coupling coefficient between the power receiving coil of the third power receiver and the power transmitting coil, the lower of frequencies corresponding to the two maximum values in the third power receiver is determined so as to be equal to the operating frequency, and the voltage gain in the third power receiver is determined by setting the coupling coefficient between the power receiving coil of the third power receiver and the power transmitting coil; and for the fourth power receiver, by setting a coupling coefficient between the power receiving coil of the fourth power receiver and the power transmitting coil, the voltage gain is determined by a positional relationship between a frequency at which the voltage gain in the power receiver is maximum and the operating frequency.

17. The wireless power transfer system according to claim 16, wherein the coupling coefficient is determined by a difference in the size or shape of the power receiving coil with respect to the power transmitting coil.

18. The wireless power transfer system according to claim 17, wherein the coupling coefficient is determined by the difference in the size of a radius of the power receiving coil with respect to the size of a radius of the power transmitting coil.

19. The wireless power transfer system according to claim 17, wherein the coupling coefficient is determined by the difference in the shape of the power receiving coil which is helical with respect to the shape of the power transmitting coil which is helical.

20. The wireless power transfer system according to claim 16, wherein the coupling coefficient is determined by a distance of the power receiving coil to the power transmitting coil.

\* \* \* \* \*